United States Patent [19]
Willard

[11] 3,761,776
[45] Sept. 25, 1973

[54] MULTI-PHASE ELECTRIC CIRCUIT BREAKER

[75] Inventor: Henry G. Willard, Wethersfield, Conn.

[73] Assignee: General Electric Company, New York, N.Y.

[22] Filed: Dec. 26, 1972

[21] Appl. No.: 318,397

[52] U.S. Cl. .................................. 317/33 R, 335/17
[51] Int. Cl. .................................................. H02h 1/00
[58] Field of Search...................... 317/112, 22, 58, 317/33 R; 335/13, 17

[56] References Cited
UNITED STATES PATENTS
3,440,491  4/1969  Tenenbaum et al. ................. 317/22

Primary Examiner—James D. Trammell
Attorney—John M. Prutzman et al.

[57] ABSTRACT

A low profile molded case for a multi-phase electric circuit breaker compactly houses a static trip control unit and current transformers by displacing a portion of each phase conductor strap into nestable and operative relationship with the transformers and the static units and by modifying the trip mechanism.

9 Claims, 2 Drawing Figures

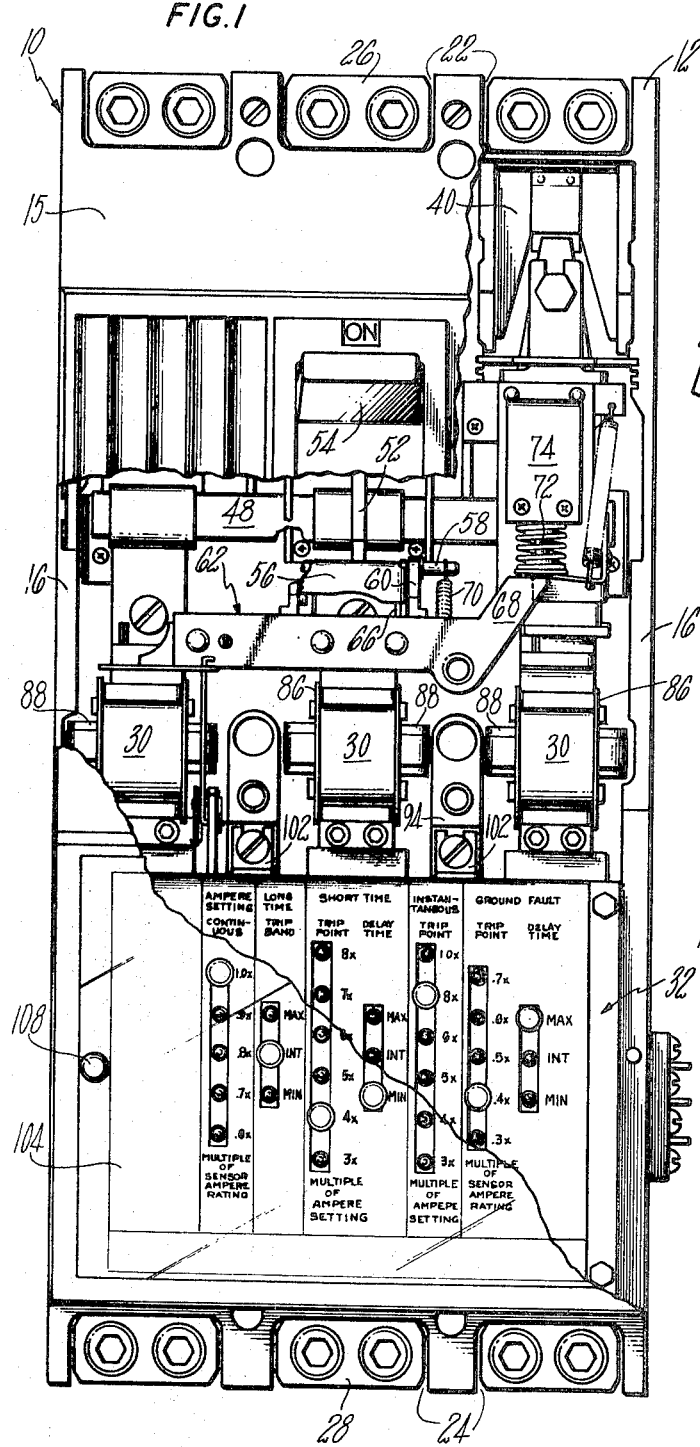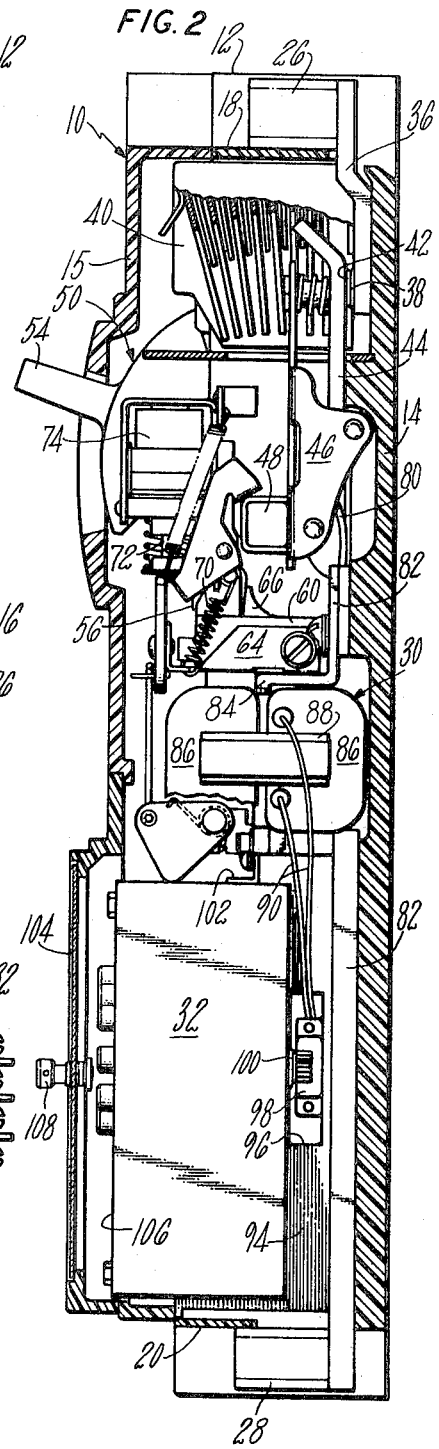

MULTI-PHASE ELECTRIC CIRCUIT BREAKER

BACKGROUND AND SUMMARY OF THE INVENTION

The present invention relates generally to electric circuit breakers of the molded case type and is more particularly concerned with a new and improved multi-phase circuit breaker using a "static" or electronic trip control circuit.

In recent years, electric circuit breakers of the molded case type have frequently utilized bi-metal controlled trip-latch mechanisms both alone and in combination with current limiting fuses for overload protection of multi-phase systems. The fuses were conveniently mounted adjacent the load end or load terminals of the circuit breakers and could be readily removed and replaced when necessary. This combination of electric circuit breakers and fuses advantageously performed the functions of a switch and automatic interrupting mechanism. However, such an arrangement frequently required tandem or "piggy back" assemblies occupying an inordinate amount of space.

It has now been found that by utilizing a "static" or electronic trip control unit in place of the combined bi-metal and magnetic control the equivalent functions can be provided for overload protection of the system. Unfortunately, the "static" trip control unit is of a size that does not readily permit its substitution for the current limiting fuses and bi-metal assemblies utilized heretofore and therefore, it has been found necessary to mount the trip control unit outside the housing for the circuit breaker. This generally necessitates the utilization of wires outside of the circuit breaker and subjects the connections to damage during handling, storage and maintenance operations.

In accordance with the present invention, these and other disadvantages have been obviated by redesigning, rearranging and relocating the relative positions of the various components to provide the compact and efficient housing of all components within a molded case while keeping the case at substantially the same size as that utilized heretofore.

Another object of the present invention is the maintenance of a low profile molded case design for "static" or electronic trip controlled circuit breakers by utilizing low profile current transformers and nestably arranging them in operative relationship with phase conductor straps while at the same time eliminating the bi-metal controlled trip unit and simplifying the trip assembly. Included in this object is the provision for a new and improved electric circuit breaker provided with an electronic control package or programmer fully housed within the molded case thereby eliminating the necessity for outside transformers and wires susceptible to breakage or damage during shipment, handling or maintenance operations.

Still another object of the present invention is to provide a new and improved electric circuit breaker design utilizing a more streamlined and efficient trip bar construction and a magnetic trip actuating device responsive to a relatively low power trip signal.

A further object of the present invention is to provide an electric circuit breaker of the type described exhibiting an economical in-line arrangement of the separable contacts, current transformer and electronic programming unit while at the same time effecting economies of manufacture and improved operating characteristics without increased size.

Other objects will be in part obvious and in part pointed out more in detail hereinafter.

These and related objects are accomplished in accordance with the present invention by providing a self-contained multi-phase electric circuit breaker having a low profile covered insulating housing with a substantially planar back plate and cover. A plurality of line terminals are carried by the casing at one end thereof and corresponding load terminals for each phase are carried by the casing remote from the line terminals. Relatively, separable contacts for each phase are mounted in alignment with their respective line terminals and are operative for simultaneous and common movement between open and closed circuit positions. A phase conductor strap is provided for connecting the load terminal of each phase to its respective separable contacts with a portion of each phase conductor strap being displaced from the back plate of the insulating case. A current transformer for each phase is mounted within the case in nestable and operative relationship with the displaced portion of the phase conductor strap for generating control signals proportional to the current flowing through said phase conductor straps. Additionally, the circuit breaker inlcudes a "static" or electronic trip control unit responsive to signals received from the current transformers for automatically tripping all phases of the breaker simultaneously. The trip control unit as well as the current transformers and trip assembly are fully enclosed and housed within the molded insulating case of conventional size.

A better understanding of the invention will be obtained from the following detailed description and the accompanying drawing which set forth an illustrative embodiment indicative of the way in which the principles of the invention are employed.

A BRIEF DESCRIPTION OF THE DRAWING

In the drawing:

FIG. 1 is a top plan view of a circuit breaker embodying the features of the present invention, the cover thereof being broken away for viewing the various components housed within the casing; and FIG. 2 is a side elevation view partially in section with the side of the molded casing removed to expose the components.

DESCRIPTION OF THE PREFERRED EMBODIMENT

Referring now to the drawing in greater detail wherein like reference numerals indicate like parts in both figures, a tri-phase electric circuit breaker is illustrated as embodying the present invention. The circuit breaker is comprised of a generally rectangular insulating case 10 of durable molded construction, such as a case made of a polyester-fiberglass insulating material. The covered case includes a box-like base portion 12 having a generally planar insulating back plate 14, integral side walls 16 upstanding from the back plate along the entire length of the circuit breaker and apertured end walls 18 and 20 provided with a plurality of terminal locating recesses or carrels, designated by the numeral 22 and 24 respectively. In the embodiment illustrated, the carrels on opposite ends of the breaker are positioned in alignment for receiving their respective line and load terminals 26, 28. It will be understood, of course, that the relative location of the terminals and particularly the load terminals may vary without departing from the spirit of the invention. The electrical path between the respective line and load terminals will be referred to as a "phase" such that the embodiment illustrated is a three-phase electric circuit breaker with each phase extending along linearly the length of the circuit breaker. The several components of the circuit breaker mechanism including current transformers 30 for each phase and a static trip control unit 32 are mounted within the box-like base of the insulated case and are fully enclosed by the cover 15 of molded insulated material which rests on the walls 16, 18 and 20 and is suitably fastened or sealed to the base to form the low profile housing for the circuit breaker.

Each line terminal 26 mounted within a separate carrel 22 is supported by and electrically connected to a short length of conductive strap 36 which extends into the interior of the case through the apertured end wall 18. The straps 36 are supported by the back plate 14 of the case and in turn, fixedly carry stationary contacts 38 within individual arch suppressing chambers 40 located adjacent the end wall 18. A moveable contact 42 carried by a conductive contact arm 44 is provided for each phase of the multi-phase circuit breaker and, in conventional fashion, is pivotally supported by a contact arm mount 46 fixedly secured to a common cross arm 48. The separable contacts are interconnected by the common cross arm extending fully across the circuit breaker for simultaneous and common pivotal movement between their closed circuit position shown in FIG. 2 and their separated or open circuit position (not shown).

A common operating mechanism suitably connected to the separable contacts and indicated generally by the numeral 50 is provided for simultaneously actuating all three moveable contacts 42 either manually or automatically between their open and closed circuit positions. The mechanism 50 includes a trip-latch 52 operatively associated with both the contacts and the manually operated handle 54 and adapted to be driven by the handle 54 during its movement toward its "off" position. A latching member 56 is pivotably supported on the pin 58 journalled in bracket 60 affixed to the insulating back plate 14 of the casing. An insulating trip bar 62 is fixedly mounted on a supporting yoke 64 which is pivotally mounted on the bracket 60. The bracket 60 also carries an intermediate latch 66 which releasably engages and is held by the trip bar yoke 64. The trip bar 62 includes an obliquely extending portion 68 and is biased in a clockwise direction as viewed in FIG. 2 by spring 70 into engagement with the end of push rod 72 controlled by the magnetic trip actuating device 74. The latching member 56 and intermediate latch 66 are also biased in a clockwise direction as viewed in FIG. 2 by a torsion spring (not shown) mounted on pin 58.

Movement of the manual handle 54 to the "off" position will condition the trip mechanism for a subsequent tripping operation. This operation is similar to that described in Stokes U.S. Pat. No. 3,171,922 assigned to the assignee of this application. The trip-latch 52 is driven by the handle 54 into latching engagement with the latching member 56 causing counterclockwise rotation thereof against the bias of its torsion spring mounted on pin 58 and movement of the intermediate latch 66 against the trip bar yoke 64 held by spring 70 against counterclockwise movement as as viewed in FIG. 2. Thus with the latch 52 held by latching member 56 and the latter prevented from moving by trip bar 62, the circuit breaker is in a cocked or loaded condition. Subsequent movement of the handle 54 to the "on" position does not alter this condition but merely rotates the moveable contacts in a clockwise direction as viewed in FIG. 2 into their illustrated closed circuit position.

As mentioned, the manually operated handle 54 is located centrally across the transverse dimension of the circuit breaker. On one side thereof is a sensitive magnetic trip actuating device 74 suited for operation by a relatively low power signal pulse for moving the trip bar 62 in a counterclockwise direction as viewed in FIG. 2 against the bias of its retaining spring 70 to permit release of the intermediate latch 66, latching member 56 and trip-latch 52 and effect tripping of the circuit breaker to provide simultaneous open circuit conditions within all three phases controlled by the circuit breaker. The sensitive magnetic trip actuating device 74 is preferably of the construction and operation described and claimed in my U.S. Pat. No. 3,693,122 assigned to the assignee of this application. The details of construction and operation of this mechanism are fully set forth in the aforementioned patent.

The moveable contacts are electrically connected through the contact arms 44 and flexible conductors 80 to their respective elongated phase conductor straps 82 extending toward the load terminal end of the circuit breaker in substantial alignment with the separable contacts, the load terminals 28 being secured to the outer end of each phase conductor strap 82. In the embodiment illustrated, both the conductor straps 36 mounting the stationary contacts and line terminals and the phase conductor straps 82 extending from the flexible conductors to the load terminals are mounted in intimate contact with the generally planar back plate 14 of the electrical circuit breaker. However, it is a feature of the present invention that a portion 84 of each phase conductor strap 82 located between the load terminal and the separable contact is displaced substantially from the back plate for passage through the low profile current transformers 30 associated with each phase of the multi-phase circuit breaker.

As best seen in FIG. 1, three current transformers 30 are arranged in a side-by-side relationship across the circuit breaker with each transformer also being disposed in alignment with the line and load terminals and separable contacts of its respective phase. Each of the current transformers are of low profile construction and are mounted within the casing in a nestable and operative relationship with the displaced portion 84 of its respective phase conductor strap. As shown, the current transformers are of the dual winding type with the windings 86 encircling complementary C-shaped cores designated generally by the numeral 88. The windings 86 for each transformer are front to back spaced coils connected in series to provide an additive ampere turn output and substantially improved output due to the additive effect of the windings. As mentioned, the tranformers function to generate control signals proportional to the current flowing through the conductor strap portion 84 extending through the cores 88. By means of suitable leads 90 these signals are fed to the electronic programmer or static trip control unit 32.

The base 12 of the casing in the area located between the current transformers 30 and the load terminal 28 is divided into three longitudinally extending channels through which run the phase conductor straps 82. These channels are formed by the side walls 16 of the casing and by a pair of interior dividing walls 94 integrally upstanding from the back plate 14 and extending from the end wall 20 continuously to a point between the current transformer 30. The dividing walls 94 are each provided with a central notch 96 midway along their length for receiving a single electrical socket 98 to which the transformer leads 90 are connected.

The programmer or static trip control unit 32 is a self-contained easily removable modular device housing solid state circuitry suited to providing control over various conditions that might occur within any of the three phases controlled by the circuit breaker. As mentioned, this solid state device is electrically and operatively connected to the magnetic trip actuating device 74 and to the current transformers 30 by means of a plug 100 readily connected to the socket 98. The static trip control unit 32 extends fully across the circuit breaker and rests on the dividing walls 94 in spaced overlying and nestable relationship with the phase conductor straps 82 which extend along the channels from the current transformers 30 to the load terminal 28. The modular unit is secured to the insulating casing by means of a pair of bolted brackets 102 secured to the interior walls 94 adjacent the transformer end thereof.

The substantially flat cover plate of the casing includes a separable transparent cover portion 104 which permits visual read-out of the top control panel 106 of the electronic trip control unit 32 and is provided with a tamper-proof leaded sealing device 108 permitting authorized removal of the transparent portion when it is required to change the setting on the central panel.

As will be readily appreciated, the circuit breaker in its closed position permits current flow from the line terminal to current transformer of each phase through the closed separable contact. The current transformers generate a control signal proportional to the current flowing through the phase conductor straps associated therewith and the control signals are fed to the electronic programming unit which in turn controls the operation of the sensitive magnetic trip actuating mechanism. Accordingly, if the control signals generated by the transformers exceed certain preselected values as determined by the electronic trip control unit, the magnetic trip actuating device is activated and will drive the trip bar in a counterclockwise direction as viewed in FIG. 2 against the bias of its retaining spring and release the latching member for simultaneous and common opening of all three separable contact assemblies. This "static" operation obviates the need for a bi-metal trip control assembly or a combined bi-metal and magnetic unit while providing an equivalent function with improved accuracy and range for the long time delay and instantaneous trip functions. Additionally, the self-contained compact unit eliminates the necessity for wires outside the circuit breaker casing without enlarging the desirable low profile configuration of the circuit breaker.

As will be apparent to persons skilled in the art, various modifications, adaptations and variations of the foregoing specific disclosure can be made without departing from the teachings of the present invention.

I claim:

1. A self-contained multi-phase electric circuit breaker comprising a low profile covered insulating casing having a substantially planar back plate; a line terminal for each phase carried by the casing at one end thereof; a load terminal for each phase carried by the casing remote from the line terminals; separable contacts for each phase mounted in alignment with their respective line terminals and operative for simultaneous and common movement between open and closed circuit positions; a phase conductor strap for each phase connecting the load terminals to their respective separable contacts, a portion of each phase conductor strap being inwardly displaced from said back plate, and a current transformer for each phase mounted within the casing in nestable and operative relationship with the displaced portion of its respective phase conductor strap for generating control signals proportional to the current flowing through said phase conductor strap.

2. The circuit breaker of claim 1 including a modular electronic programming unit carried by and within the casing adjacent the load terminals and current transformers and in nestable relationship with a portion of said phase conductor straps other than said displaced portion, said programming unit being operatively connected to said current transformers and said separable contacts for opening said contacts in response to control signals generated by said current transformers.

3. The circuit breaker of claim 1 wherein the current transformers are low profile dual-winding transformers with the windings connected in series to provide an additive ampere turn output.

4. The circuit breaker of claim 3 wherein the displaced portion of each phase conductor strap passes through its respective transformers intermediate the dual windings and in elevated relationship to the back plate.

5. The circuit breaker of claim 1 including a trip mechanism and an electronic trip control unit, and wherein the insulating casing is a molded housing fully enclosing the separable contacts, current transformers, trip mechanism and electronic control unit in compact nested relationship within the low profile casing.

6. The circuit breaker of claim 1 including a static trip control unit, and a trip mechanism operatively connected to the separable contacts for rapidly moving the contacts to their open position, said trip mechanism being operative on said trip mechanism to open said contacts in response to a signal from the static trip control unit.

7. The circuit breaker of claim 6 wherein the trip control unit includes solid state trip circuits and the trip mechanism includes an insulating trip bar for rapidly releasing the separable contacts for movement toward their open position and a magnetic trip actuating device operative for initiating the releasing operation of the trip bar, said trip circuits being operative in response to signals generated by the current transformers associated with each phase of the circuit breaker to effect operation of the magnetic trip device.

8. The circuit breaker of claim 1 wherein the load terminals are located at the end of said casing opposite said one end and said phase conductor straps extend from said load terminals toward the separable contacts in alignment with the contacts, the breaker including a self-contained static trip control unit in superimposed nested relationship with said phase conductor straps, said trip control unit having a top control panel, said covered casing including a transparent cover portion permitting visual read-out of said top control panel.

9. The circuit breaker of claim 8 wherein the transparent cover portion is provided with a tamper-proof seal.

* * * * *